United States Patent
Christensen et al.

(10) Patent No.: US 10,239,524 B2
(45) Date of Patent: Mar. 26, 2019

(54) METHOD AND SYSTEM FOR INDICATING A POTENTIAL LANE SHIFT OF A VEHICLE

(71) Applicant: VOLVO CAR CORPORATION, Gothenburg (SE)

(72) Inventors: Claus Allan Christensen, Copenhagen S (DK); Christian Hedegaard, Valby—Copenhagen (DK); Thomas Bove, Copenhagen K (DK)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/274,069

(22) Filed: Sep. 23, 2016

(65) Prior Publication Data

US 2017/0096139 A1    Apr. 6, 2017

(30) Foreign Application Priority Data

Oct. 1, 2015    (EP) ................................. 15187890

(51) Int. Cl.
*B60W 30/095* (2012.01)
*B62D 15/02* (2006.01)
(Continued)

(52) U.S. Cl.
CPC ........ *B60W 30/0956* (2013.01); *B60W 10/20* (2013.01); *B60W 30/09* (2013.01);
(Continued)

(58) Field of Classification Search
CPC ...... B60W 10/20; B60W 50/10; B60W 50/14; B60W 30/0956; B60W 30/09;
(Continued)

(56) References Cited

U.S. PATENT DOCUMENTS

| 8,666,599 B2 | 3/2014 | Otuka | |
|---|---|---|---|
| 2013/0335213 A1* | 12/2013 | Sherony | G08G 1/167 340/439 |
| 2015/0057907 A1* | 2/2015 | Rebhan | B60W 50/0097 701/93 |

FOREIGN PATENT DOCUMENTS

| DE | 102009048789 A1 | 10/2009 |
|---|---|---|
| DE | 10-2009-048789 | * 4/2011 |

(Continued)

OTHER PUBLICATIONS

Extended European Search Report from priority European application EP15187890.7, dated Mar. 10, 2016 (8 pages).

*Primary Examiner* — Muhammad Shafi
(74) *Attorney, Agent, or Firm* — Brooks Kushman P.C.

(57) ABSTRACT

A lane shift indicating system for indicating a potential lane shift of a vehicle supporting at least partly automated steering and vehicle speed control, when the vehicle is travelling along a first driving lane of a road having a second driving lane separated from the first driving lane by one or more lane markings. The lane shift indicating system determines a driving environment of the vehicle at an initial vehicle position, and determines that the driving environment indicates that the vehicle is in a driving situation where a lane shift from the first driving lane to the second driving lane is considered appropriate, and adjusts the steering prior to a potential automated vehicle speed adjustment pertinent the determined driving situation, such that the vehicle continues its travel laterally closer to the one or more lane markings along the first driving lane, as compared to the initial vehicle position.

15 Claims, 4 Drawing Sheets

(51) Int. Cl.
  *B60W 30/09* (2012.01)
  *B60W 10/20* (2006.01)
  *B60W 50/10* (2012.01)
  *B60W 50/14* (2012.01)
  *G05D 1/00* (2006.01)
  *G05D 1/02* (2006.01)
  *G08G 1/16* (2006.01)
  *B60W 30/12* (2006.01)
  *B60W 30/18* (2012.01)

(52) U.S. Cl.
  CPC ...... *B60W 30/12* (2013.01); *B60W 30/18163* (2013.01); *B60W 50/10* (2013.01); *B60W 50/14* (2013.01); *B62D 15/025* (2013.01); *B62D 15/0255* (2013.01); *G05D 1/0088* (2013.01); *G05D 1/0223* (2013.01); *G08G 1/167* (2013.01); *B60W 2050/146* (2013.01); *B60W 2550/10* (2013.01); *B60W 2550/30* (2013.01); *B60W 2710/20* (2013.01); *B60W 2720/10* (2013.01)

(58) Field of Classification Search
  CPC ............ B60W 30/12; B60W 30/18163; G05D 1/0088; G05D 1/0223; G08G 1/167; B62D 15/025; B62D 15/0255; B62D 1/0088
  USPC .................... 701/23, 400–541; 340/988–996
  See application file for complete search history.

(56) References Cited

FOREIGN PATENT DOCUMENTS

DE  102013218280 A1  9/2013
EP      2492165 A1  8/2012

\* cited by examiner

METHOD AND SYSTEM FOR INDICATING A POTENTIAL LANE SHIFT OF A VEHICLE

CROSS-REFERENCE TO RELATED APPLICATIONS

This application claims foreign priority benefits under 35 U.S.C. § 119(a)-(d) to European patent application number EP 15187890.7, filed Oct. 1, 2015, which is incorporated herein by reference in its entirety.

TECHNICAL FIELD

The present disclosure relates to a lane shift indicating system for indicating a potential lane shift of a vehicle supporting at least partly automated steering and at least partly automated vehicle speed control, when said vehicle is travelling along a first driving lane of a road further comprising at least a second driving lane separated from said first driving lane by one or more lane markings.

BACKGROUND

Vehicles—even though travelling along the same road—may for one reason or another travel at different speeds. For instance, a first vehicle may be driven at a vehicle speed way under the speed limit of the road, a second vehicle may be keeping the speed limit, a third vehicle may be driven at a vehicle speed above the speed limit and so forth. Naturally, in order for the traffic to flow smoothly, overtaking of slower-moving vehicles may be appropriate. Conventionally, overtaking—which may implicate a change of driving lanes—is commonly accomplished by a high degree of control by the vehicle driver.

In recent years, however, development of vehicles being at least partly autonomous has been, and increasingly is, growing rapidly. Some at least partly autonomous vehicles may require some initial input or continuous input from e.g. the vehicle driver. Other systems, for example autopilot systems, may be used only when the system has been engaged, which permits e.g. the vehicle driver to switch from a manual mode—where the driver exercises a high degree of control over the movement of the vehicle, to an autonomous mode—where the vehicle essentially drives itself, to modes that lie somewhere in between. Semi-autonomous or autonomous vehicles, the latter also commonly known as autonomously driven vehicles, driverless vehicles, self-driving vehicles, or robot vehicles, are known to sense their surrounding with techniques such as e.g. radar, lidar, GPS and/or computer vision. Advanced control systems may interpret sensory information to identify appropriate paths, as well as obstacles.

U.S. Pat. No. 8,666,599, for instance, provides a driving support system, which comprises a steering control unit controlling a steering operation of a vehicle, a lane keeping support unit performing driving support for lane keeping, and a lane change support unit performing a lane change by instructing the lane keeping support unit to cancel lane keeping. However, although U.S. Pat. No. 8,666,599 supports a driving operation at the time of lane change, it would be beneficial with an approach supporting yet smoother potential lane changes.

SUMMARY

It is therefore an object of embodiments herein to provide an improved lane shift approach for a vehicle supporting at least partly automated steering and at least partly automated vehicle speed control, when the vehicle is, or soon will be, in a driving situation where a lane shift is considered appropriate.

According to a first embodiment herein, there is provided a method performed by a lane shift indicating system for indicating a potential lane shift of a vehicle supporting at least partly automated steering and at least partly automated vehicle speed control, when the vehicle is travelling along a first driving lane of a road further comprising at least a second driving lane separated from the first driving lane by one or more lane markings. The lane shift indicating system determines a driving environment of the vehicle at an initial vehicle position. Moreover, the lane shift indicating system determines that the driving environment indicates that the vehicle is, or soon will be, in a driving situation where a lane shift from the first driving lane to the second driving lane is considered appropriate. Furthermore, the lane shift indicating system adjusts the steering prior to a potential automated initiation of an vehicle speed adjustment pertinent the determined driving situation, such that the vehicle continues its travel laterally closer to the one or more lane markings along the first driving lane, as compared to the initial vehicle position.

Thereby, an approach is provided which informs a potential vehicle occupant—e.g. a driver—of the vehicle, and/or a potential vehicle occupant—e.g. a driver—of an adjacent vehicle, of a potential lane change. Since the lane shift indicating system determines a driving environment of the vehicle at an initial vehicle position, the driving conditions at least partly surrounding the vehicle, and which may have impact thereon, are established at an arbitrary current position of the vehicle. Moreover, since the lane shift indicating system determines that the driving environment indicates that the vehicle is, or soon will be, in a driving situation where a lane shift from the first driving lane to the second driving lane is considered appropriate, there is established that pertinent a determined driving situation, a change of lanes from the first lane to the second lane is—or is about to become—suitable. Furthermore, since the lane shift indicating system adjusts the steering prior to a potential initiation of an automated vehicle speed adjustment pertinent the determined driving situation, such that the vehicle continues its travel laterally closer—as compared to the initial vehicle position—to the one or more lane markings along the first driving lane, the vehicle is—even before being subjected to a possible automated vehicle speed change which may be initiated from the determined driving situation by a commonly known automated vehicle speed control system—positioned laterally nearer the one or more lane markings as the vehicle continues its driving in the first driving lane. Accordingly, since the one or more lane markings borders to the second driving lane, and since the automated steering of the vehicle is adapted to place the vehicle laterally closer to the one or more lane markings as the vehicle continues its travel in the first driving lane, the continued lateral position of the vehicle nearer the one or more lane markings indicates in an intuitive manner to a potential vehicle occupant of the vehicle, and/or to a potential vehicle occupant of an adjacent vehicle, that the vehicle is subjected to a driving situation where a lane change from the first to the second driving lane is considered suitable. Furthermore, since the lateral adjustment of the vehicle closer to the one or more lane markings as suggested by the inventive concept is initiated prior to a possible automatic initiation of an automated vehicle speed reduction/increase which may be initiated due to the determined driving situation, a potential vehicle occupant of the vehicle and/or a potential vehicle occupant of an adjacent vehicle to whom a change of vehicle speed may be perceived as annoying, may be encouraged and/or given a hint as to the potential suitable lane shift even before the automated speed of the vehicle potentially is adjusted by the commonly known automated vehicle speed control system. Accordingly, by indicating to the potential vehicle occupant e.g. the driver of the ego vehicle, and/or to a potential vehicle occupant e.g. a driver of an adjacent vehicle, of a suitable lane change of the ego vehicle prior to the vehicle speed thereof being automatically decreased or increased, a smoother lane change, such as e.g. an overtaking, may be supported. That is, a potential driver may—following been given the hint of the suitable lane shift—initiate and/or carry out himself the lane shift, and/or a driver of an adjacent vehicle may facilitate said lane shift by making way.

For that reason, there is provided an improved lane shift approach for a vehicle supporting at least partly automated steering and at least partly automated vehicle speed control, when the vehicle is, or soon will be, in a driving situation where a lane shift is considered appropriate.

The technical features and corresponding advantages of the above mentioned method will be discussed in further detail in the following.

By introducing a method performed by a lane shift indicating system for indicating a potential lane shift of a vehicle supporting at least partly automated steering and at least partly automated vehicle speed control, when the vehicle is travelling along a first driving lane of a road further comprising at least a second driving lane separated from the first driving lane by one or more lane markings, an approach is provided which informs a potential vehicle occupant of the vehicle, and/or a potential vehicle occupant of an adjacent vehicle, of a possible lane change from the first driving lane to the second. The word "vehicle" may refer to any arbitrary vehicle, such as car, truck, lorry, van, bus, motor cycle, scooter, tractor, golf cart or military vehicle. The vehicle may support a varying level of automation, ranging from function-specific automation to full self-driving automation, i.e. ranging from semi-autonomous to fully autonomous. Accordingly, the vehicle may support a varying level of steering automation and a varying level of vehicle speed control automation, as commonly known in the art. Subsequently, the vehicle may support being at least partly automatically steered, for instance such that the vehicle as commonly known may be essentially laterally centred in the driving lane in which the vehicle is travelling. Correspondingly, the vehicle may support having its speed being at least partly automatically controlled, for instance such that the vehicle speed as commonly known may be automatically adjusted pertinent a slower vehicle ahead, i.e. in relation to a slower vehicle ahead. Subsequently, the lane shift indicating system of the inventive concept may be adapted to communicate with such a corresponding commonly known automated steering system of the vehicle, as well as with such a corresponding commonly known automated vehicle speed control system. Said lane shift indicating system may be at least partly comprised in the vehicle, for instance in one or more control units (CPUs) thereof.

The word "vehicle occupant" may refer to "vehicle driver" and/or "vehicle operator". Moreover, the word "road" may refer to any suitable surface intended for vehicle driving, and may thus be represented by a road of any shape, width and length, comprising any arbitrary number of driving lanes, intersections, cross sections etc. The expression of the vehicle "travelling" along a first driving lane may refer to the vehicle "driving" and/or "at least partly automatically driving" along a first driving lane. Moreover, the word "along" may refer to "in", whereas "a first driving lane" may refer to any arbitrary driving lane of the road in which driving lane the vehicle is travelling. The "second driving lane" may refer to any arbitrary driving lane of said road to which a potential lane shift may take place, i.e. a driving lane adjacent the first driving lane. The second driving lane may accordingly be represented by a driving lane intended for driving in the same direction as that of the first driving lane, or by a driving lane intended for driving in the opposite direction. Since the road may comprise more than two driving lanes and the first driving lane accordingly may be a driving lane between two other driving lanes, the second driving lane may refer to either one of said two other driving lanes, depending on the situation at hand. The "one or more lane markings" separating the second driving lane from the first, may refer to a single road marking or a plurality thereof provided between the first and second driving lane, e.g. on the ground of the road. The one or more "lane markings", also commonly referred to as "lane markers", "road markings", and/or "road markers", or where applicable "centre lines", may be of various lengths, widths and/or shapes, and distances and relations between lane markings may vary. Moreover, the one or more "lane markings" may refer to "virtual lane markings" and/or "virtual data points", which may be defined by a virtual model of the driving environment. The one or more lane markings may refer to a single or plurality of commonly known separators provided to form straight and/or curved intermittent and/or continuous lines between the first and second driving lanes. Moreover, the expression "indicating" a potential lane shift may refer to "signalling" and/or "suggesting" a potential lane shift. Furthermore, the word "potential" lane shift may refer to "possible" lane shift, whereas "lane shift" may refer to "lane change" and/or "changing of driving lanes".

Since the lane shift indicating system determines a driving environment of the vehicle at an initial vehicle position, the driving conditions at least partly surrounding the vehicle and which may have impact thereon are established at an arbitrary current position of the vehicle. For instance, adjacent vehicles and/or objects and their distances and/or velocities compared to the ego vehicle may be e.g. detected and/or sensed. "Ego vehicle" is throughout this disclosure intended to refer to the vehicle comprising the lane shift indicating system. Determining the driving environment may be performed intermittently and/or continuously. Moreover, determining the driving environment may be accomplished in any arbitrary known manner, e.g. with support from one or more of an environment detecting sensor, e.g. an ambient sensor—such as a camera sensor, radar sensor, LIDAR (Light detection and Ranging) sensor, laser sensor and/or by utilizing computer vision techniques, all of which are known per se to the person skilled in the art, and from which the driving environment may be derived by the lane shift indicating system—for instance over a wired communications bus such as via e.g. CAN, FlexRay, MOST, V2V or the like, or wirelessly such as via e.g. Bluetooth, WiFi or the like. Additionally or alternatively, determining the driving environment may be accomplished with support from a virtual model of the driving environment, as commonly known in the art. The expression "determining" a driving environment may refer to "detecting", "sensing", "monitoring" and/or "deriving" a driving environment, and/or refer to "deriving" the driving environment "from one or more of an environment detecting sensor(s) on-board the vehicle". Moreover, "determining the driving environment" may refer to "determining the driving environment in a forward, backward and/or sideways direction of the vehicle", whereas the expression "driving environment" may refer to "surrounding driving conditions" and/or—according to one example—to "virtual driving environment".

Since the lane shift indicating system determines that the driving environment indicates that the vehicle is, or soon will be, in a driving situation where a lane shift from the first driving lane to the second driving lane is considered appropriate, there is established that pertinent a determined driving situation, a change of lanes from the first to the second is—or is about to become—suitable. Determining that a lane shift from the first to the second driving lane is considered appropriate—promptly or within a near future—may be accomplished in any arbitrary manner known in the art, e.g. with support from commonly known techniques and/or algorithms establishing and/or interpreting that pertinent the determined driving situation, the vehicle is—or will soon be—suitable for a lane change. The expression "determining that the driving environment indicates, may refer to "calculating", "interpreting", "deriving", "making a decision" and/or "estimating" that the driving environment indicates. Moreover, the expression that the driving environment "indicates" may refer to that the driving environment "insinuates", whereas "driving situation" may refer to "overtaking situation". The word "appropriate" may refer to "suitable", whereas the expression "considered appropriate" may refer to "determined appropriate", "calculated appropriate", "estimated appropriate" and/or "appropriate". Furthermore, the expression "soon will be" may refer to "is about to be", "will within a near future be", and/or "will be within 1-60 seconds".

Since the lane shift indicating system adjusts the steering prior to a potential initiation of an automated vehicle speed adjustment pertinent the determined driving situation, such that the vehicle continues its travel laterally closer—as compared to the initial vehicle position—to the one or more lane markings along the first driving lane, the vehicle is—even before being subjected to a possible automated vehicle speed change which may be initiated from the determined driving situation by a commonly known automated vehicle speed control system—positioned laterally nearer the one or more lane markings as the vehicle continues its driving in the first driving lane. Accordingly, since the one or more lane markings borders to the second driving lane, and since the automated steering of the vehicle is adapted to place the vehicle laterally closer to the one or more lane markings as the vehicle continues its travel in the first driving lane, the continued lateral position of the vehicle nearer the one or more lane markings indicates in an intuitive manner to a potential driver of the vehicle, and/or to a potential driver of an adjacent vehicle, that the vehicle is subjected to a driving situation where a lane change from the first to the second driving lane is considered suitable. Furthermore, since the lateral adjustment of the vehicle closer to the one or more lane markings as suggested by the inventive concept is initiated prior to a possible automatic initiation of an automated vehicle speed reduction/increase which may be initiated due to the determined driving situation, a potential driver of the vehicle and/or a potential driver of an adjacent vehicle to whom a change of vehicle speed may be perceived as annoying, may be encouraged and/or given a hint as to the potential suitable lane shift even before the automated speed of the vehicle potentially is adjusted by the commonly known automated vehicle speed control system. Accordingly, by indicating—"giving a hint"—to the potential driver of the ego vehicle, and/or to a potential driver of an adjacent vehicle, of a suitable lane change of the ego vehicle prior to the vehicle speed thereof being automatically decreased or increased, a smoother lane change, such as e.g. an overtaking, may be supported. That is, the potential driver may—following been given the hint of the suitable lane shift—initiate and/or carry out himself the lane shift, and/or a driver of an adjacent vehicle may facilitate said lane shift by making way. The adjustment of the steering performed by the lane shift indicating system of the inventive concept may be independent of the potential automated vehicle speed adjustment which may be performed by a commonly known automated vehicle speed control system.

The expression "adjusting" the steering may refer to "adapting", "affecting", "intervening in" and/or "influencing" the steering, whereas the expression "prior to" a potential initiation of an automated vehicle speed adjustment may refer to "at least slightly prior to", "before" and/or "ahead of" a potential initiation of an automated vehicle speed adjustment. Moreover, the word "potential" may refer to "possible" and/or "feasible", whereas the expression potential "initiation of an automated vehicle speed adjustment" may refer to potential "initiation of an automated vehicle speed increase and/or speed reduction" and/or potential "initiation of an automated vehicle speed adjustment initiated by an automated vehicle speed control system". The expression "pertinent" the determined driving situation may refer to "pertinent to", "initiated due to" and/or "initiated as a consequence of" the determined driving situation. Furthermore, the expression that the vehicle "continues its travel" may refer to that the vehicle "continues its driving", "continues to cruise", "continues to travel", "proceeds its travel" and/or "proceeds", whereas the expression "laterally closer to" the one or more lane markings may refer to "laterally nearer" and/or "laterally un-centred in the first driving lane, closer to" the one or more lane markings. The expression "laterally closer to" the one or more lane markings" may refer to "closer in a lateral direction of the first driving lane" and/or "closer in a lateral direction of the vehicle" to the one or more lane markings", whereas the expression "such that" the vehicle continues its travel laterally closer may refer to "said adjusting the steering resulting in that", "said steering being adjusted such that" and/or ", wherein said steering is adjusted such that" the vehicle continues its travel laterally closer.

Optionally, the one or more lane markings may comprise visual lane markings, and the lane shift indicating system may then adjust the steering prior to a potential initiation of an automated vehicle speed adjustment pertinent the determined driving situation, such that the vehicle continues its travel laterally closer to the one or more visual lane markings along the first driving lane, as compared to the initial vehicle position. Thereby, the lane markings are visually detectable directly or indirectly by the lane shift indicating system, by a potential one or more commonly known environment detecting sensor, by a potential vehicle occupant e.g. a driver of the ego vehicle, and/or by a potential vehicle occupant e.g. a driver of an adjacent vehicle. Accordingly, since the one or more visual lane markings borders to the second driving lane, and since the automated steering of the vehicle is adapted to place the vehicle laterally closer to the one or more visual lane markings as the vehicle continues its travel in the first driving lane, the continued lateral position of the vehicle nearer the one or more visual lane markings indicates in an intuitive manner to a potential vehicle occupant of the vehicle, and/or to a potential vehicle occupant of an adjacent vehicle, that the vehicle is subjected to a driving situation where a lane change from the first to the second driving lane is considered suitable. The visual one or more lane markings may for instance be 2-dimensional or essentially 2-dimensional, e.g. being represented by paint, such as white and/or yellow paint, provided on the road surface. Length, width, shape etc. of a lane marking may vary, as well as distances and relations between lane markings may vary.

Optionally, the lane shift indicating system may further adjust the steering prior to a potential initiation of an automated vehicle speed adjustment pertinent the determined driving situation, such that the vehicle continues its travel with a lateral edge portion of the vehicle being positioned a maximum lateral distance from the one or more lane markings along the first driving lane. Thereby, by a lateral edge portion of the vehicle being positioned a maximum lateral distance from the one or more lane markings, lateral closeness of the vehicle to the one or more lane markings is supported as the vehicle continues its travel in the first driving lane. The maximum lateral distance may take on any arbitrary feasible value placing the vehicle laterally un-centred in the first driving lane, closer to the one or more lane markings. The expression "lateral edge portion of the vehicle" may refer to "closest portion of the vehicle", "outer portion of the vehicle", "nearest portion" and/or "nearest portion of the vehicle—which nearest portion faces said one or more lane markings". Moreover, the expression nearest "portion" may refer to nearest "portion of the vehicle chassis", and/or nearest "edge", "section" and/or "segment". The expression "maximum lateral distance" may refer to "maximum distance in a lateral direction of the first driving lane" and/or "maximum distance in a lateral direction of the vehicle". Furthermore, the expression "maximum lateral distance from the one or more lane markings" may refer to "maximum lateral distance from a nearest edge of the one or more lane markings, which nearest edge faces the lateral edge portion of the vehicle".

According to an example, the maximum lateral distance may be less than 20 percent of a determined lateral width of the first driving lane. According to another example, the maximum lateral distance may be less than 10 percent of a determined lateral width of the first driving lane. According to yet another example, the maximum lateral distance may be less than 5 percent of a determined lateral width of the first driving lane. Thereby, the maximum lateral distance is implemented as a percentage of a determined width of the first driving lane. Determination of the lateral width of the first driving lane may be accomplished in any arbitrary known manner, for instance by means of a width determining unit, e.g. by deriving and/or detecting said width by means of e.g. a camera and/or laser, and/or by deriving said width from a commonly known map data base holding map data of the first driving lane. The expression "lateral width of the first driving lane" may refer to "lateral width of the first driving lane valid at a current vehicle position", "width of the first driving lane in a lateral direction of the first driving lane", and/or "lateral inner width of the first driving lane".

Alternatively, the maximum lateral distance may be implemented utilizing a numerical distance value independent of the width of the first driving lane. Such a distance value may for instance range from 0.2 to 1 meter.

Optionally, the driving situation may comprise the vehicle approaching a slower vehicle ahead. Thereby, the vehicle may be subjected to an overtaking situation, where the ego vehicle overtaking the slower vehicle ahead is considered appropriate. Such a situation may for instance occur should the first driving lane be a driving lane other than the most outer one of a road comprising at least two driving lanes, e.g. other than the most left driving lane in case of right-hand traffic and/or e.g. other than the most right driving lane in case of left-hand traffic. By adjustment of the steering such that the vehicle continues its travel laterally closer to the one or more lane markings, it is thus indicated to a potential vehicle occupant e.g. a driver of the ego vehicle, as well as to a potential vehicle occupant e.g. a driver of the preceding vehicle, that the ego vehicle is in a suitable overtaking situation. The expression slower "vehicle ahead" may refer to slower "preceding vehicle", whereas "approaching" may refer to "coming closer to" and/or "nearing". According to a further embodiment, the driving situation may comprise the vehicle approaching a slower vehicle ahead in the first driving lane.

Additionally or alternatively, the driving situation may comprise the vehicle being approached by a faster vehicle from behind. Thereby, the vehicle may be subjected to an overtaking situation, where it is considered appropriate for the ego vehicle to change lanes from the first to the second driving lane for instance in order for the faster vehicle to overtake the ego vehicle in the first driving lane. Such a situation may for instance occur should the first driving lane be a driving lane other than the most inner one of a road comprising at least two driving lanes, e.g. other than the most right driving lane in case of right-hand traffic and/or e.g. other than the most left driving lane in case of left-hand traffic. By adjustment of the steering such that the vehicle continues its travel laterally closer to the one or more lane markings, it is thus indicated to a potential vehicle occupant of the ego vehicle, as well as to a potential vehicle occupant of the vehicle approaching from behind, that it is considered suitable for the ego vehicle to change lanes to enable a potential overtaking by the faster vehicle. The expression faster "vehicle from behind" may refer to faster "upcoming vehicle", whereas "being approached by" may refer to "being run up by" and/or "being caught up by". According to a further embodiment, the driving situation may comprise the vehicle being approached by a faster vehicle from behind in the first driving lane.

Optionally, the lane shift indicating system may further adjust the steering such that the vehicle continues its travel laterally closer to the one or more lane markings along the first driving lane, until it is determined that the determined driving situation no longer applies. Thereby, the adjusted steering placing the vehicle laterally closer to the one or more lane markings may be maintained up until it is determined that said driving situation has ceased to exist. Determining that said driving situation no longer applies may be accomplished in any arbitrary manner known in the art, for instance by determining—e.g. detecting—an updated driving environment, and subsequently an updated driving situation.

Additionally or alternatively, the lane shift indicating system may further adjust the steering such that the vehicle continues its travel laterally closer to the one or more lane markings along the first driving lane, until it is determined that the lane shift is initiated. Thereby, the adjusted steering placing the vehicle laterally closer to the one or more lane markings may be maintained up until it is determined that a lane change from the first to the second driving lane has been started. According to an example, the lane shift indicating system may subsequently initiate the lane shift, i.e. the lane shift indicating system may further subsequently adjust the steering such that the lane shift is initiated. Alternatively, initiating the lane shift may be accomplished in any arbitrary manner known in the art, for instance with support from a commonly known at least partly automated steering system and/or a commonly known at least partly automated vehicle speed control system. Yet another alternative is that the lane shift is initiated by a potential vehicle occupant e.g. a driver.

Additionally or alternatively, the lane shift indicating system may further adjust the steering such that the vehicle continues its travel laterally closer to the one or more lane markings along the first driving lane, until it is determined that the adjusted steering is aborted by a vehicle occupant of said vehicle. Thereby, the adjusted steering placing the vehicle laterally closer to the one or more lane markings may be maintained up until it is determined that the vehicle occupant e.g. the driver does not intend to initiate and/or carry out the lane shift, for instance based on the vehicle occupant manually steering the vehicle laterally away from the one or more lane markings e.g. by means of a steering device such as a steering wheel, and/or based on the vehicle occupant aborting the adjusted steering via input provided by him or her e.g. by touch or voice via a user interface provided in the vehicle. The word "aborted" may refer to "cancelled" and/or "interrupted".

Optionally, the lane shift indicating system may initiate a haptic alert within the vehicle, which alert is adapted to be noticed by a potential vehicle occupant of the vehicle. Thereby, in addition to providing a hint of the suitable lane shift by means of the adjusted steering nearer the one or more lane markings, an additional indication of the suitable lane shift is provided by means of a haptic alert noticeable in the ego vehicle. The haptic alert may be implemented in any arbitrary known manner such as by means of one or more of a commonly known vibration generating device, for instance provided in association with and/or comprised in a vehicle occupant's seat and/or in a steering device of the vehicle such as a steering wheel. The word "initiating" may refer to "providing", whereas the expression "noticed" by a potential vehicle occupant may refer to "observed", "perceived", "noticeable", "observable", and/or "perceptible" by a potential vehicle occupant e.g. a driver.

Additionally or alternatively, the lane shift indicating system may initiate a visual alert within the vehicle, which alert is adapted to be noticed by a potential vehicle occupant of the vehicle. Thereby, in addition to providing a hint of the suitable lane shift by means of the adjusted steering nearer the one or more lane markings, an additional indication of the suitable lane shift is provided by means of a visual alert noticeable in the ego vehicle. The visual alert may be implemented in any arbitrary known manner such as by means of one or more of a commonly known display, for instance provided in and/or above the instrument panel e.g. in front of the potential vehicle occupant.

Additionally or alternatively, the lane shift indicating system may initiate an audible alert within the vehicle, which alert is adapted to be noticed by a potential vehicle occupant of the vehicle. Thereby, in addition to providing a hint of the suitable lane shift by means of the adjusted steering nearer the one or more lane markings, an additional indication of the suitable lane shift is provided by means of an audible alert noticeable in the ego vehicle. The audible alert may be implemented in any arbitrary known manner such as by means of one or more of a commonly known loud speaker.

According to a second embodiment herein, there is provided a lane shift indicating system adapted for indicating a potential lane shift of a vehicle supporting at least partly automated steering and at least partly automated vehicle speed control, when the vehicle is travelling along a first driving lane of a road further comprising at least a second driving lane separated from the first driving lane by one or more lane markings. The lane shift indicating system comprises a driving environment determining unit adapted for determining a driving environment of the vehicle at an initial vehicle position. The lane shift indicating system moreover comprises a driving situation determining unit adapted for determining that the driving environment indicates that the vehicle is, or soon will be, in a driving situation where a lane shift from the first driving lane to the second driving lane is considered appropriate. Furthermore, the lane shift indicating system comprises a steering adjusting unit adapted for adjusting the steering prior to a potential initiation of an automated vehicle speed adjustment pertinent the determined driving situation, such that the vehicle continues its travel laterally closer to the one or more lane markings along the first driving lane, as compared to the initial vehicle position.

Optionally, the one or more lane markings may comprise visual lane markings, and the steering adjusting unit may then further be adapted for adjusting the steering prior to a potential initiation of an automated vehicle speed adjustment pertinent the determined driving situation, such that the vehicle continues its travel laterally closer to the one or more visual lane markings along the first driving lane, as compared to the initial vehicle position.

Optionally, the steering adjusting unit may further be adapted for adjusting the steering prior to a potential initiation of an automated vehicle speed adjustment pertinent the determined driving situation, such that the vehicle continues its travel with a lateral edge portion of the vehicle being positioned a maximum lateral distance from the one or more lane markings along the first driving lane, which maximum lateral distance may be less than 20 percent, preferably may be less than 10 percent and most preferred may be less than 5 percent of a determined lateral width of the first driving lane.

Optionally, the driving situation may comprise the vehicle approaching a slower vehicle ahead. Additionally or alternatively, the driving situation may comprise the vehicle being approached by a faster vehicle from behind.

Optionally, the driving situation may comprise the vehicle approaching a slower vehicle ahead in the first driving lane. Additionally or alternatively, the driving situation may comprise the vehicle being approached by a faster vehicle from behind in the first driving lane.

Optionally, the steering adjusting unit may further be adapted for adjusting the steering of the vehicle such that the vehicle continues its travel laterally closer to the one or more lane markings along the first driving lane, until it is determined that the determined driving situation no longer applies.

Additionally or alternatively, the steering adjusting unit may further be adapted for adjusting the steering of the vehicle such that the vehicle continues its travel laterally closer to the one or more lane markings along the first driving lane, until it is determined that the lane shift is initiated. According to an example, the steering adjusting unit may further be adjusted for subsequently adjusting the steering such that the lane shift is initiated.

Additionally or alternatively, the steering adjusting unit may further be adapted for adjusting the steering of the vehicle such that the vehicle continues its travel laterally closer to the one or more lane markings along the first driving lane, until it is determined that the adjusted steering is aborted by a vehicle occupant of the vehicle.

Optionally, the lane shift indicating system may further comprise an alert initiating unit adapted for initiating a haptic alert within the vehicle, which alert is adapted to be noticed by a potential vehicle occupant of the vehicle.

Additionally or alternatively, the alert initiating unit may be adapted for initiating a visual alert within the vehicle, which alert is adapted to be noticed by a potential vehicle occupant of the vehicle.

Additionally or alternatively, the alert initiating unit may be adapted for initiating an audible alert within the vehicle, which alert is adapted to be noticed by a potential vehicle occupant of the vehicle.

Similar advantages as those mentioned in the foregoing in relation to the first embodiment correspondingly apply to the second, which is why these advantages are not further discussed.

According to a third embodiment herein, there is provided a vehicle comprising at least a portion of the lane shift indicating system discussed above, i.e. one or more of the driving environment determining unit, the driving situation determining unit, and/or the steering adjusting unit. The vehicle furthermore comprises an at least partly automated steering system and an at least partly automated vehicle speed control system. Once more, similar advantages as those mentioned in the foregoing in relation to the first embodiment correspondingly apply to the third, which is why these advantages are not further discussed.

According to a fourth embodiment herein, there is provided a computer program product comprising a computer program containing computer program code arranged to cause a computer or a processor to execute the steps of the lane shift indicating system discussed above, stored on a computer-readable medium or a carrier wave. Yet again, similar advantages as those mentioned in the foregoing in relation to the first embodiment correspondingly apply to the fourth, which is why these advantages are not further discussed.

BRIEF DESCRIPTION OF THE DRAWINGS

The various non-limiting embodiments of the present disclosure, including particular features and advantages, will be readily understood from the following detailed description and the accompanying drawings, in which.

DETAILED DESCRIPTION

Figure 1:
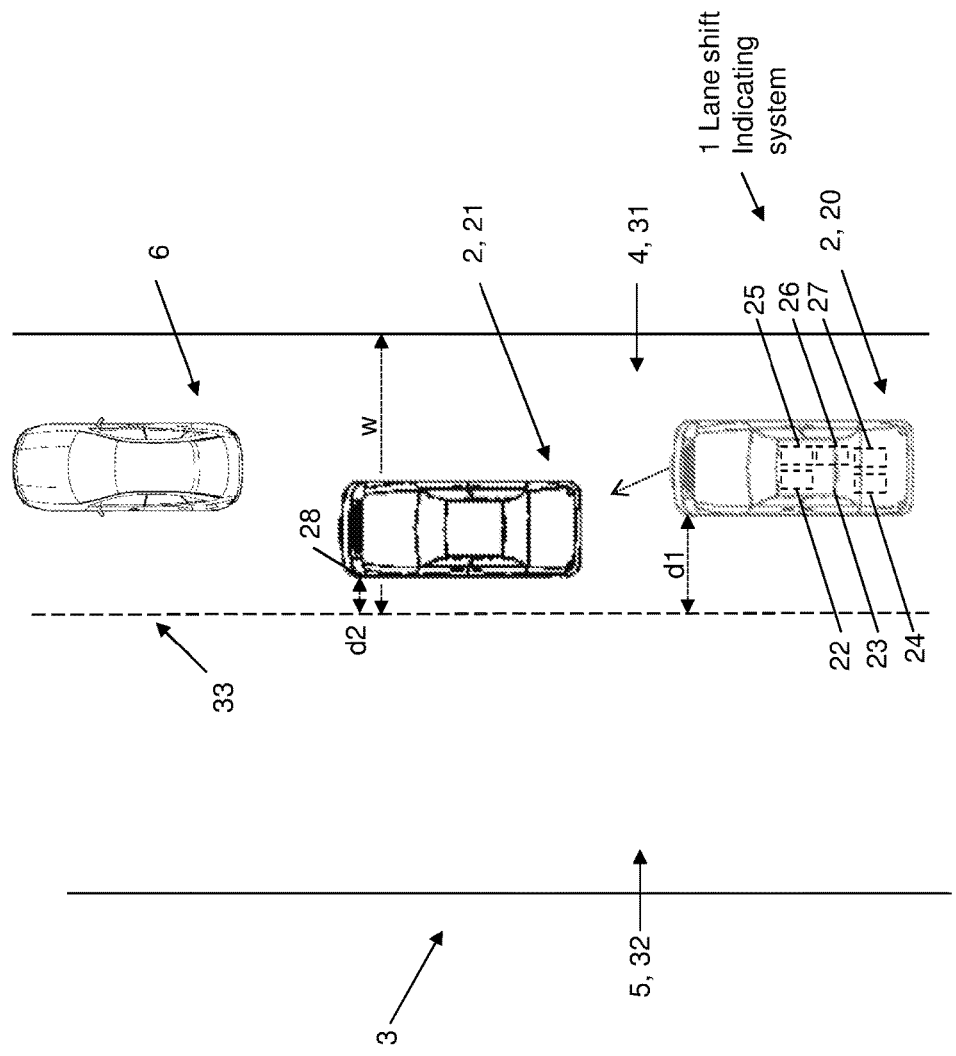
FIG. 1 illustrates an exemplifying first driving situation and a schematic overview of an exemplifying lane shift indicating system according to embodiments of the disclosure.

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The non-limiting embodiments of the present disclosure will now be described more fully hereinafter with reference to the accompanying drawings, in which embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to indicating a potential lane shift of a vehicle, there will be disclosed that the inventive concept provide an approach which in an intuitive manner informs a potential vehicle occupant e.g. a driver of the vehicle, and/or a potential vehicle occupant e.g. a driver of an adjacent vehicle, of a potential lane change.

Referring now to the figures and FIG. 1 in particular, there is depicted an exemplifying first driving situation and a schematic overview of an exemplifying lane shift indicating system 1 according to embodiments of the disclosure. The lane shift indicating system 1, which will be described in further detail later on in this description, is adapted for indicating a potential lane shift of a vehicle 2. The vehicle 2—which comprises at least a portion of the lane shift indicating system 1—is in the shown embodiment at a first instant in time at an initial position 20. Additionally, the vehicle 2 is in the shown embodiment at a second instant in time at a subsequent position 21. Said vehicle 2 supports at least partly automated steering, which optionally may be provided by means of a commonly known automated steering system 22. Moreover, the vehicle 2 furthermore supports at least partly automated vehicle speed control, which optionally may be provided by means of a commonly known vehicle speed control system 23.

Additionally, the vehicle 2 may optionally comprise one or more of an environment detecting sensor 24 such as a camera, one or more of a vibration generating device 25 e.g. comprised in a steering wheel of the vehicle 2, one or more of a display 26 available in the vehicle 2, and/or one or more of a loud speaker 27 available in the vehicle 2—all of which may be commonly known in the art.

The lane shift indicating system 1 is adapted for indicating said potential lane shift when the vehicle 2 is travelling along a first driving lane 31 of a road 3. The exemplifying road 3 is here—although the inventive concept is not restricted thereto—intended for right-hand traffic, whereby the first driving lane 31 here is represented by the inner lane 4 of the road 3. The road 3 further comprises at least a second driving lane 32. The second driving lane 32 is here represented by the outer lane 5 of the road 3, should both the first and second driving lanes 31, 32 be intended for traffic flow in the same driving direction. Alternatively, the second driving lane 32 may be represented by the driving lane for oncoming traffic, should the second driving lane 32 be intended for traffic flow in the opposite driving direction as compared to the first driving lane 32. The second driving lane 32 is separated from the first driving lane 31 by one or more lane markings 33. The one or more lane markings 33 of the shown embodiment comprise visual lane markings.

In the shown embodiment, the vehicle 2 is at least partly automatically steered along the first driving lane 31, here essentially laterally centered in the first driving lane 31. Moreover, in the shown embodiment, the speed of the vehicle 2 is at least partly automatically controlled as the vehicle 2 travels along the first driving lane 31.

Moreover, a lateral edge portion 28 of the vehicle 2 is in the shown embodiment at the first initial position 20 positioned an initial lateral distance d1 from the one or more lane markings 33 in the first driving lane 31. Correspondingly, the vehicle 2 is in the shown embodiment at the subsequent position 21 positioned a maximum lateral distance d2 from the one or more lane markings 33 in the first driving lane 31. The maximum lateral distance d2 is here less than 5 percent of a determined lateral width w of the first driving lane 31.

Further shown in FIG. 1 is another vehicle, which represents an exemplifying slower vehicle 6 ahead of the ego vehicle 2. The slower vehicle 6 is here, as well as the ego vehicle 2, positioned in the first driving lane 31 namely the inner driving lane 4, driving in the same driving direction as the ego vehicle 2. The exemplifying first driving situation is accordingly represented by a potential overtaking situation, for instance that it is suitable for the ego vehicle 2 approaching from behind to overtake the slower vehicle 6 ahead.

Figure 2:
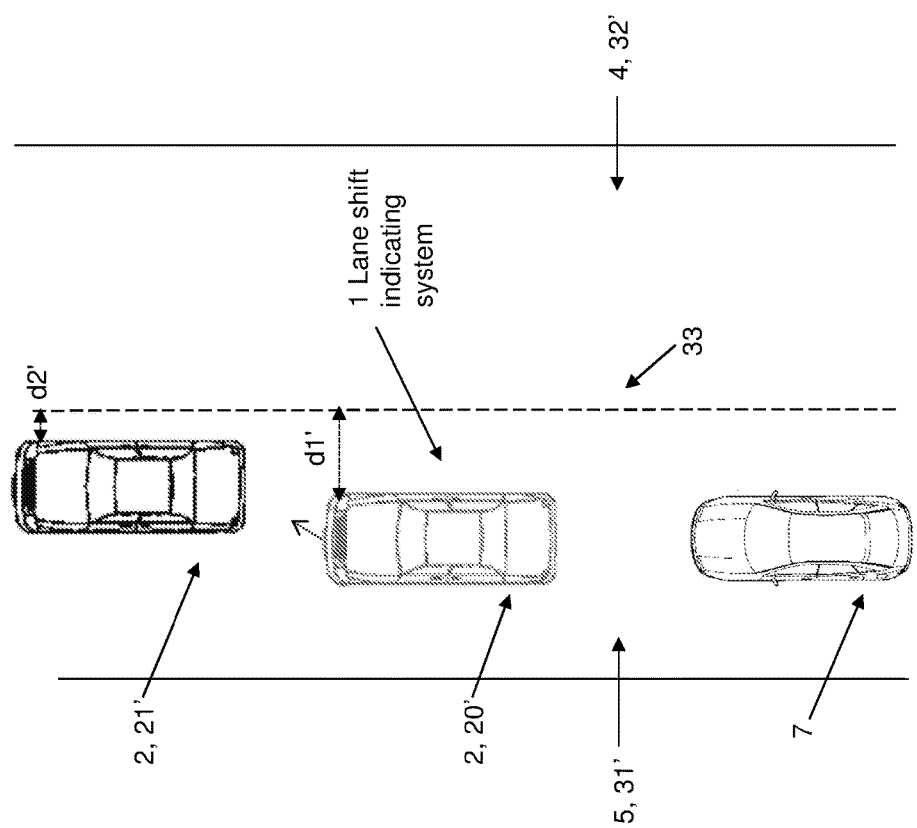
FIG. 2 illustrates an exemplifying second driving situation and a schematic overview of an exemplifying lane shift indicating system according to embodiments of the disclosure.

FIG. 2 illustrates an exemplifying second driving situation and a schematic overview of an exemplifying lane shift indicating system 1 according to embodiments of the disclosure. The description related to FIG. 1 is largely valid as well for FIG. 2, with the exception that the exemplifying second driving situation of FIG. 2 differs from the exemplifying first driving situation depicted in FIG. 1.

In the shown embodiment of FIG. 2, the vehicle 2 is travelling along the outer driving lane 5 of the road 3, which is why the first driving lane 31' thus here is represented by said outer driving lane 5. The second driving lane 32' is here represented by the inner lane 4 of the road 3. Moreover, another vehicle is here represented by an exemplifying faster vehicle 7 approaching the ego vehicle 2 from behind. The faster vehicle 7 is here, as well as the ego vehicle 2, positioned in the first driving lane 31' namely the outer driving lane 5, driving in the same driving direction as the ego vehicle 2. The exemplifying second driving situation is accordingly represented by the ego vehicle 2 preventing the faster vehicle 7 approaching from behind from overtaking said ego vehicle 2, which is why it may be suitable for the ego vehicle 2 to move to the second driving lane 32' to allow the faster vehicle 7 to pass.

Figure 3:
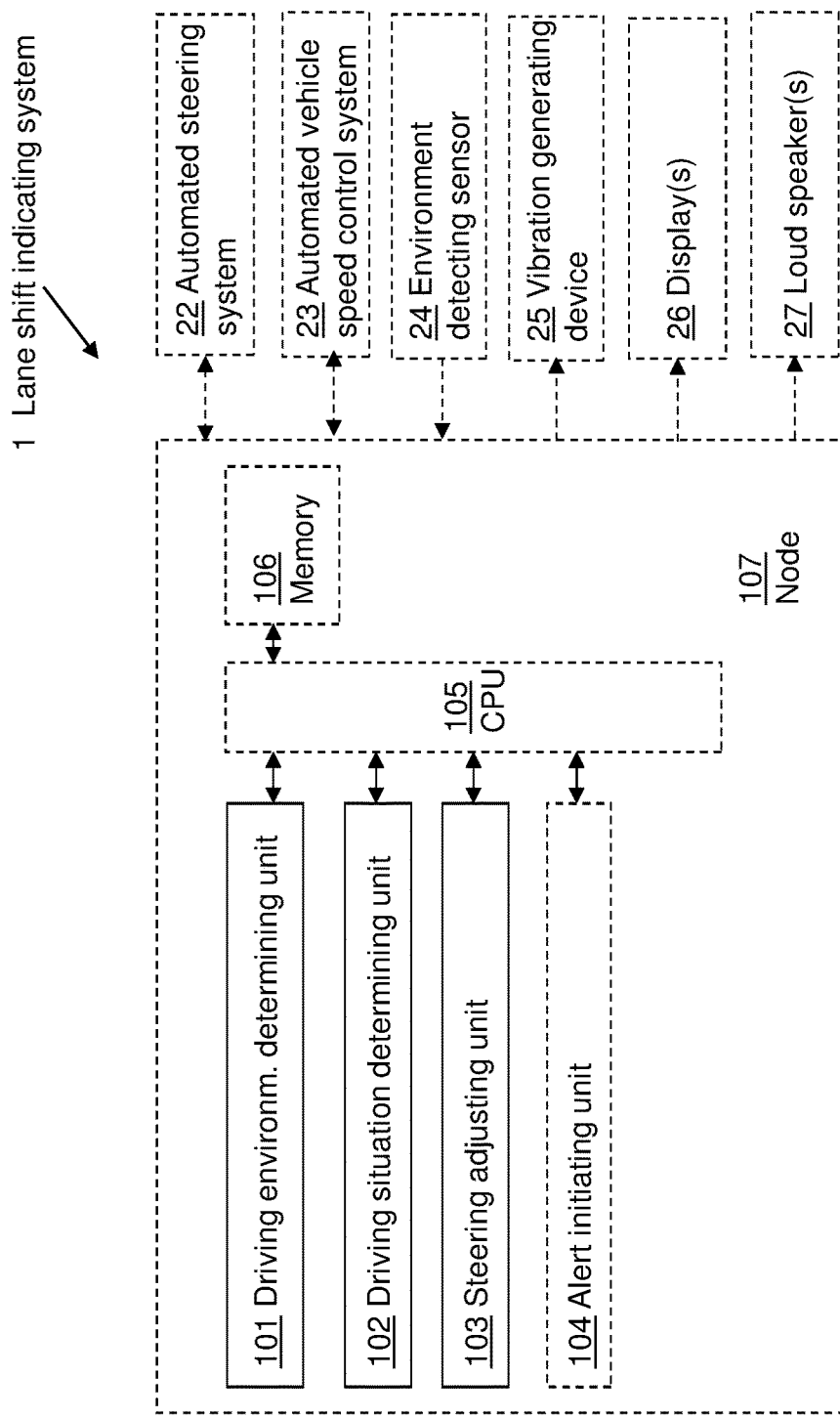
FIG. 3 is a schematic block diagram illustrating an exemplifying lane shift indicating system according to embodiments of the disclosure.

As further shown in FIG. 3, which is a schematic block diagram illustrating an exemplifying lane shift indicating system 1 according to embodiments of the disclosure, the lane shift indicating system 1 is, as previously mentioned in conjunction with FIGS. 1 and 2, adapted for indicating a potential lane shift of a vehicle 2 supporting at least partly automated steering and at least partly automated vehicle speed control, when the vehicle 2 is travelling along a first driving lane 31, 31' of a road 3 further comprising at least a second driving lane 32, 32' separated from the first driving lane 31, 31' by one or more lane markings 33.

The lane shift indicating system 1 comprises a driving environment determining unit 101, a driving situation determining unit 102, and a steering adjusting unit 103, all of which will be described in further detail below. The lane shift indicating system 1 may moreover comprise an optional alert initiating unit 104, which similarly will be described in further detail below. Furthermore, the embodiments herein may be implemented through one or more processors, such as a processor 105, here denoted CPU, together with computer program code for performing the functions and actions of the embodiments herein. Said program code may also be provided as a computer program product, for instance in the form of a data carrier carrying computer program code for performing the embodiments herein when being loaded into the lane shift indicating system 1. One such carrier may be in the form of a CD ROM disc. It is however feasible with other data carriers such as a memory stick. The computer program code may furthermore be provided as pure program code on a server and downloaded to the lane shift indicating system 1.

The lane shift indicating system 1 may further comprise a memory 106 comprising one or more memory units. The memory 106 may be arranged to be used to store e.g. information, and further to store data, configurations, schedulings, applications and/or parameters relating to the detected driving environment, the initial vehicle position 20, 20', steering of the vehicle 2, and/or the maximum lateral distance d2, d2' etc., to perform the methods herein when being executed in the lane shift indicating system 1.

Furthermore, the driving environment determining unit 101, the driving situation determining unit 102, the steering adjusting unit 103, the optional alert initiating unit 104, the optional processor 105, and/or the optional memory 106, may for instance be implemented in one or several arbitrary nodes, such as a node 107, comprised in the vehicle 2. A node 107 may be an electronic control unit (ECU) or any suitable generic electronic device, and may involve, for instance, an active safety domain module node and/or a main central node. According to an alternative example, the node 107 may, as a complement to being represented by e.g. one or several integrated ECUs, be represented by a plug-in solution, for instance a dongle. In that manner, an aftermarket solution may be provided to any arbitrary vehicle suitable.

Those skilled in the art will also appreciate that the driving environment determining unit 101, the driving situation determining unit 102, the steering adjusting unit 103, and/or the optional alert initiating unit 104, may refer to a combination of analog and digital circuits, and/or one or more processors configured with software and/or firmware, e.g. stored in a memory such as the memory 106, that when executed by the one or more processors such as the processor 105 perform as will be described in more detail below. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 4:
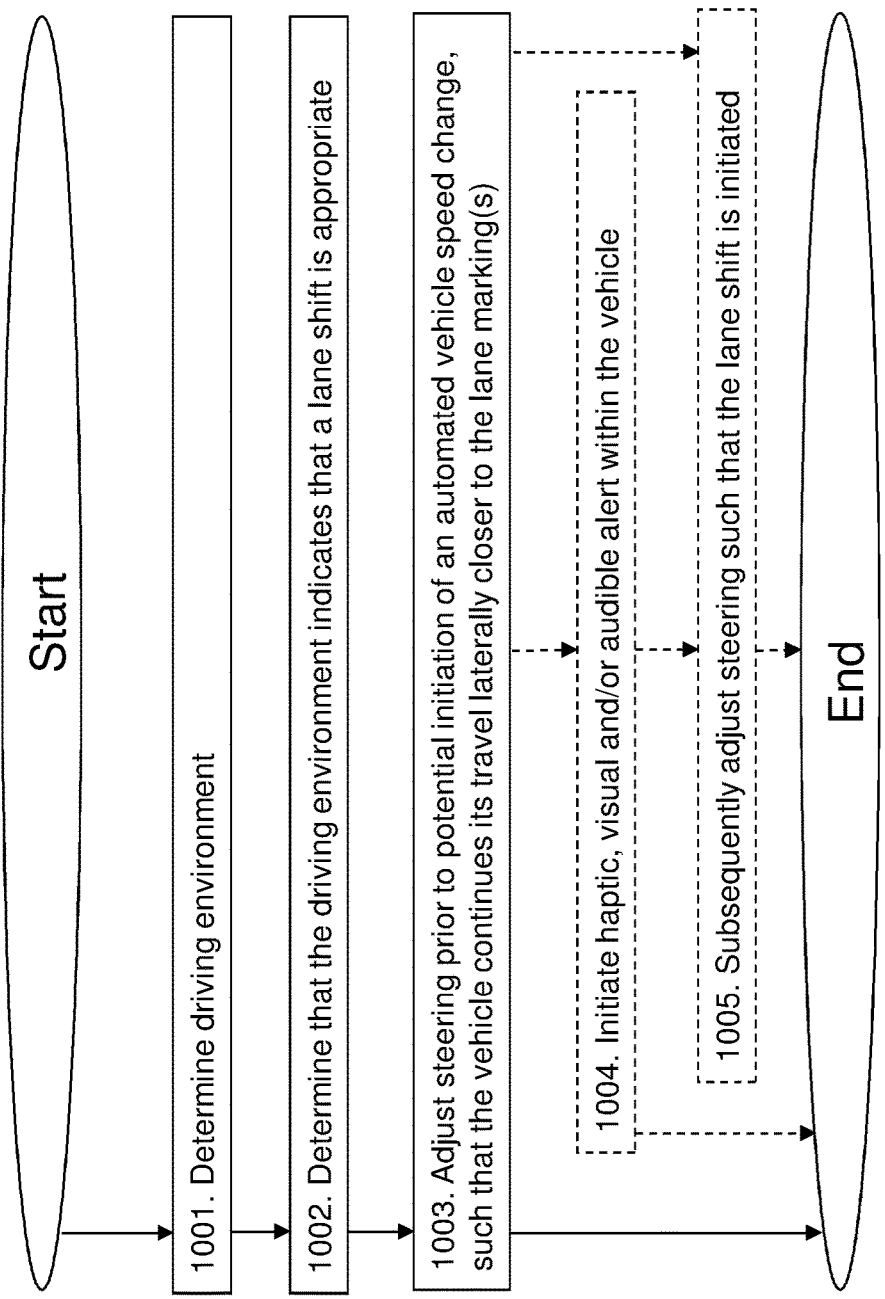
FIG. 4 is a flowchart depicting an exemplifying method performed by an exemplifying lane shift indicating system according to embodiments of the disclosure.

FIG. 4 is a flowchart depicting an exemplifying method performed by an exemplifying lane shift indicating system 1 according to embodiments of the disclosure. The method in the lane shift indicating system 1 is, as previously indicated, for indicating a potential lane shift of a vehicle 2 supporting at least partly automated steering and at least partly automated vehicle speed control, when the vehicle 2 is travelling along a first driving lane 31, 31' of a road 3 further comprising at least a second driving lane 32, 32' separated from the first driving lane 31, 31' by one or more lane markings 33.

The exemplifying method, which may be continuously repeated, comprises the following actions discussed with support from FIGS. 1-3. The method may be continuously and/or intermittently repeated as considered suitable for the implementation at hand. The actions may be taken in any suitable order, and/or one or more actions may even be performed simultaneously where applicable. For instance, Actions 1003 and 1004 may be performed essentially simultaneously, and/or in an alternate order.

Action 1001

In Action 1001, the lane shift indicating system 1 determines a driving environment of the vehicle 2 at the initial vehicle position 20, 20'. Correspondingly, the driving environment determining unit 101 is adapted for determining a driving environment of the vehicle 2 at the initial vehicle position 20, 20'.

Thus, as shown with support from FIGS. 1-3, the driving conditions at least partly surrounding the vehicle 2 and which may have impact thereon are established at an arbitrary current position 20, 20' of the vehicle 2—for instance with support from the one or more environment detecting sensor(s) 24.

Action 1002

In Action 1002, the lane shift indicating system 1 determines that the driving environment indicates that the vehicle 2 is, or soon will be, in a driving situation where a lane shift from the first driving lane 31, 31' to the second driving lane 32, 32' is considered appropriate. Correspondingly, the driving situation determining unit 102 is adapted for determining that the driving environment indicates that the vehicle 2 is, or soon will be, in a driving situation where a lane shift from the first driving lane 31, 31' to the second driving lane 32, 32' is considered appropriate.

Thus, as shown with support from FIGS. 1-3, there is established—for instance with support from solutions commonly known in the art—that pertinent a determined driving situation, a change of lanes from the first 31, 31' to the second 32, 32' is—or is about to become—suitable.

Optionally, the driving situation may comprise the vehicle 2 approaching the slower vehicle 6 ahead, which slower vehicle 6 for instance is positioned in the first driving lane 31, 31'. Thus, as shown with support from FIGS. 1-2, the vehicle 2 may be subjected to an overtaking situation, where the ego vehicle 2 overtaking the slower vehicle 6 ahead is considered appropriate.

Alternatively, the driving situation may optionally comprise the vehicle 2 being approached by the faster vehicle 7 from behind, which faster vehicle 7 for instance is positioned in the first driving lane 31, 31'. Thus, as shown with support from FIGS. 1 and 3, the vehicle 2 may be subjected to a situation, where it is considered appropriate for the ego vehicle 2 to change lanes from the first 31, 31' to the second driving lane 32, 32', for instance in order to enable the faster vehicle 7 to subsequently overtake the ego vehicle 2 in the first driving lane 31, 31'.

Action 1003

In Action 1003, the lane shift indicating system 1 adjusts the steering prior to a potential initiation of an automated vehicle speed adjustment pertinent the determined driving situation, such that the vehicle 2 continues its travel laterally closer to the one or more lane markings 33 along the first driving lane 31, 31', as compared to the initial vehicle position 20, 20'. Correspondingly, the steering adjusting unit 103 is adapted for adjusting the steering prior to a potential initiation of an automated vehicle speed adjustment pertinent the determined driving situation, such that the vehicle 2 continues its travel laterally closer to the one or more lane markings 33 along the first driving lane 31, 31', as compared to the initial vehicle position 20, 20'.

Thus, as shown with support from FIGS. 1-3, the vehicle 2 is—even before being subjected to a possible automated vehicle speed change which may be initiated from the determined driving situation by the commonly known automated vehicle speed control system 23—positioned laterally nearer the one or more lane markings 33 as the vehicle 2 continues its driving in the first driving lane 31, 31', for instance with support from the automated steering system 22. Accordingly, since the one or more lane markings 33 borders to the second driving lane 32, 32', and since the automated steering of the vehicle 2 is adapted to place the vehicle 2 laterally closer to the one or more lane markings 33 as the vehicle continues its travel in the first driving lane 31, 31', the continued lateral position of the vehicle 2 nearer the one or more lane markings 33 indicates in an intuitive manner to a potential vehicle occupant e.g. a driver of the vehicle 2, and/or to a potential vehicle occupant e.g. a driver of an adjacent vehicle 6, 7, that the ego vehicle 2 is subjected to a driving situation where a lane change from the first 31, 31' to the second driving lane 32, 32' is considered suitable. Furthermore, since the lateral adjustment of the vehicle 2 closer to the one or more lane markings 33 as suggested by the inventive concept is initiated prior to a possible automatic initiation of an automated vehicle speed reduction/increase which may be initiated due to the determined driving situation, a potential driver of the vehicle 2 and/or a potential driver of an adjacent vehicle 6, 7 to whom a change of vehicle speed may be perceived as annoying, may be encouraged and/or given a hint as to the potential suitable lane shift even before the automated speed of the vehicle potentially is adjusted by the commonly known automated vehicle speed control system 23. Accordingly, by indicating to the potential driver of the ego vehicle 2, and/or to a potential driver of an adjacent vehicle 6, 7, of a suitable lane change of the ego vehicle 2 prior to the vehicle speed thereof being automatically decreased or increased, a smoother lane change, such as e.g. an overtaking, may be supported. That is, the potential driver may—following been given the hint of the suitable lane shift—initiate and/or carry out himself the lane shift, and/or a driver of an adjacent vehicle 6, 7 may facilitate said lane shift by making way.

Optionally, the one or more lane markings 33 may comprise visual lane markings. The lane shift indicating system 1 may then adjust the steering prior to a potential initiation of an automated vehicle speed adjustment pertinent the determined driving situation, such that the vehicle 2, 2' continues its travel laterally closer to the one or more visual lane markings 33 along the first driving lane 31, 31', as compared to the initial vehicle position 20, 20'. Correspondingly, the steering adjusting unit 103 may then be adapted for adjusting the steering prior to a potential initiation of an automated vehicle speed adjustment pertinent the determined driving situation, such that the vehicle 2, 2' continues its travel laterally closer to the one or more visual lane markings 33 along the first driving lane 31, 31', as compared to the initial vehicle position 20, 20'.

Thus, as shown with support from FIGS. 1-3, the lane markings 33 are visually detectable directly or indirectly by the lane shift indicating system 1, by the potential one or more commonly known environment detecting sensor 24, by a potential vehicle occupant e.g. a driver of the ego vehicle 2, 2', and/or by a potential vehicle occupant e.g. a driver of an adjacent vehicle 6, 7. Accordingly, since the one or more visual lane markings 33 borders to the second driving lane 32, 32', and since the automated steering of the vehicle 2, 2' is adapted to place the vehicle 2, 2' laterally closer to the one or more visual lane markings 33 as the vehicle 2, 2' continues its travel in the first driving lane 31, 31', the continued lateral position of the vehicle 2, 2' nearer the one or more visual lane markings 33 indicates in an intuitive manner to a potential vehicle occupant of the vehicle 2, 2', and/or to a potential vehicle occupant of an adjacent vehicle 6, 7, that the vehicle 2, 2' is subjected to a driving situation where a lane change from the first driving lane 31, 31' to the second driving lane 32, 32' is considered suitable.

Optionally, the lane shift indicating system 1 may further adjust the steering prior to a potential initiation of an automated vehicle speed adjustment pertinent the determined driving situation, such that the vehicle 2 continues its travel with the lateral edge portion 28 of the vehicle 2 being positioned a maximum lateral distance d2, d2' from the one or more lane markings 33 along the first driving lane 31, 31', which maximum lateral distance d2, d2' may be less than 20 percent, preferably may be less than 10 percent and most preferred may be less than 5 percent of the determined lateral width w of the first driving lane 31, 31'. Correspondingly, the steering adjusting unit 103 may further be adapted for adjusting the steering prior to a potential initiation of an automated vehicle speed adjustment pertinent the determined driving situation, such that the vehicle 2 continues its travel with the lateral edge portion 28 of the vehicle 2 being positioned a maximum lateral distance d2, d2' from the one or more lane markings 33 along the first driving lane 31, 31', which maximum lateral distance d2, d2' may be less than 20 percent, preferably may be less than 10 percent and most preferred may be less than 5 percent of the determined lateral width w of the first driving lane 31, 31'.

Thus, as shown with support from FIGS. 1-3, by a lateral edge portion 28 of the vehicle 2 being positioned a maximum lateral distance d2, d2' from the one or more lane markings 33, lateral closeness of the vehicle 2 to the one or more lane markings 33 is supported as the vehicle 2 continues its travel in the first driving lane 31, 31'.

Moreover, optionally, the lane shift indicating system 1 may further adjust the steering such that the vehicle 2 continues its travel laterally closer to the one or more lane markings 33 along the first driving lane 31, 31', until it is determined that: the determined driving situation no longer applies; the lane shift is initiated; and/or the adjusted steering is aborted by a potential vehicle occupant e.g. a driver of the vehicle 2. Correspondingly, the steering adjusting unit 103 may further be adapted for adjusting the steering of the vehicle 2 such that the vehicle 2 continues its travel laterally closer to the one or more lane markings 33 along the first driving lane 31, 31', until it is determined that: the determined driving situation no longer applies; the lane shift is initiated; and/or the adjusted steering is aborted by a vehicle occupant e.g. a driver of the vehicle 2.

Thus, as shown with support from FIGS. 1-3, the adjusted steering placing the vehicle 2 laterally closer to the one or more lane markings 33 may be maintained up until it is determined that the driving situation has ceased to exist, up until it is determined that a lane change from the first 31, 31' to the second driving lane 32, 32' has been started, and/or up until it is determined that a potential vehicle occupant e.g. a driver does not intend to initiate and/or carry out said lane shift.

Action 1004

In optional Action 1004, the lane shift indicating system may initiate a haptic, visual and/or audible alert within the vehicle 2, which alert is adapted to be noticed by a potential vehicle occupant of the vehicle 2. Correspondingly, the alert initiating unit 104 may be adapted for initiating a haptic, visual and/or audible alert within the vehicle 2, which alert is adapted to be noticed by a vehicle occupant of the vehicle 2.

Thus, as shown with support from FIGS. 1-3, in addition to providing a hint of the suitable lane shift by means of the adjusted steering nearer the one or more lane markings 33, an additional indication of the suitable lane shift may be provided by means of a haptic alert e.g. provided with support from the one or more vibration generating device(s) 25, by means of a visual alert e.g. provided with support from the one or more display(s) 26, and/or by means of an audible alert e.g. provided with support from the one or more loud speaker(s) 27.

Action 1005

In optional Action 1005, the lane shift indicating system 1 may further subsequently adjust the steering such that the lane shift is initiated. Correspondingly, the steering adjusting unit 103 may further be adapted for subsequently adjusting the steering such that the lane shift is initiated.

Thus, as shown with support from FIGS. 1-3, the lane shift indicating system 1 may—following upon the steering adjustment of Action 1003—subsequently additionally start the changing of lanes from the first driving lane 31, 31' to the second driving lane 32, 32'.

The person skilled in the art realizes that the present disclosure by no means is limited to the embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by a lane shift indicating system for indicating a potential lane shift of a vehicle supporting at least partly automated steering and at least partly automated vehicle speed control, when the vehicle is travelling along a first driving lane of a road further comprising at least a second driving lane separated from the first driving lane by one or more lane markings, the method comprising:
   determining, by a driving environment determining unit, a driving environment of the vehicle at an initial vehicle position, wherein determining the driving environment is performed using at least one environment detecting sensor selected from the group comprising a camera sensor, a radar sensor, a light detection and ranging sensor, and a laser sensor;
   determining, by a driving situation determining unit, that the driving environment indicates that the vehicle is, or soon will be, in a driving situation where a lane shift from the first driving lane to the second driving lane is considered appropriate; and
   adjusting, by a steering adjusting unit, the steering such that the vehicle continues its travel laterally closer to the one or more lane markings along the first driving lane, as compared to the initial vehicle position, for a period of time prior to initiation of an automated vehicle speed adjustment pertinent the determined driving situation for a lane shift.

2. The method according to claim 1 wherein the one or more lane markings comprise visual lane markings, and wherein the adjusting comprises adjusting the steering prior to a potential initiation of an automated vehicle speed adjustment pertinent the determined driving situation, such that the vehicle continues its travel laterally closer to the one or more visual lane markings along the first driving lane, as compared to the initial vehicle position.

3. The method according to claim 1 wherein adjusting the steering further comprises adjusting the steering prior to a potential initiation of an automated vehicle speed adjustment pertinent the determined driving situation, such that the vehicle continues its travel with a lateral edge portion of the vehicle being positioned a maximum lateral distance from the one or more lane markings along the first driving lane, which maximum lateral distance may be less than 20 percent of a determined lateral width of the first driving lane.

4. The method according to claim 1 wherein the driving situation comprises:
the vehicle approaching a slower vehicle ahead; and/or
the vehicle being approached by a faster vehicle from behind.

5. The method according to claim 1 wherein the driving situation comprises:
the vehicle approaching a slower vehicle ahead in the first driving lane; and/or
the vehicle being approached by a faster vehicle from behind in the first driving lane.

6. The method according to claim 1 wherein adjusting further comprises adjusting the steering such that the vehicle continues its travel laterally closer to the one or more lane markings along the first driving lane, until it is determined that:
the determined driving situation no longer applies;
the lane shift is initiated; and/or
the adjusted steering is aborted by a vehicle occupant of the vehicle.

7. The method according to claim 1 further comprising initiating a haptic, visual and/or audible alert within the vehicle, which alert is adapted to be noticed by a potential vehicle occupant of the vehicle.

8. A lane shift indicating system adapted for indicating a potential lane shift of a vehicle supporting at least partly automated steering and at least partly automated vehicle speed control, when the vehicle is travelling along a first driving lane of a road further comprising at least a second driving lane separated from the first driving lane by one or more lane markings, the lane shift indicating system comprising:
a driving environment determining unit adapted for determining a driving environment of the vehicle at an initial vehicle position, wherein determining the driving environment is performed using at least one environment detecting sensor selected from the group comprising a camera sensor, a radar sensor, a light detection and ranging sensor, and a laser sensor;
a driving situation determining unit adapted for determining that the driving environment indicates that the vehicle is, or soon will be, in a driving situation where a lane shift from the first driving lane to the second driving lane is considered appropriate; and
a steering adjusting unit adapted for adjusting the steering such that the vehicle continues its travel laterally closer to the one or more lane markings along the first driving lane, as compared to the initial vehicle position, for a period of time prior to initiation of an automated vehicle speed adjustment pertinent the determined driving situation for a lane shift.

9. The lane shift indicating system according to claim 8 wherein the one or more lane markings comprise visual lane markings, and wherein the steering adjusting unit further is adapted for adjusting the steering prior to a potential initiation of an automated vehicle speed adjustment pertinent the determined driving situation, such that the vehicle continues its travel laterally closer to the one or more visual lane markings along the first driving lane, as compared to the initial vehicle position.

10. The lane shift indicating system according to claim 8 wherein the steering adjusting unit further is adapted for adjusting the steering prior to a potential initiation of an automated vehicle speed adjustment pertinent the determined driving situation, such that the vehicle continues its travel with a lateral edge portion of the vehicle being positioned a maximum lateral distance from the one or more lane markings along the first driving lane, which maximum lateral distance may be less than 20 percent of a determined lateral width of the first driving lane.

11. The lane shift indicating system according to claim 8 wherein the driving situation comprises:
the vehicle approaching a slower vehicle ahead; and/or
the vehicle being approached by a faster vehicle from behind.

12. The lane shift indicating system according to claim 8 wherein the driving situation comprises:
the vehicle approaching a slower vehicle ahead in the first driving lane; and/or
the vehicle being approached by a faster vehicle from behind in the first driving lane.

13. The lane shift indicating system according to claim 8 wherein the steering adjusting unit further is adapted for adjusting the steering of the vehicle such that the vehicle continues its travel laterally closer to the one or more lane markings along the first driving lane, until it is determined that:
the determined driving situation no longer applies;
the lane shift is initiated; and/or
the adjusted steering is aborted by a vehicle occupant of the vehicle.

14. The lane shift indicating system according to claim 8 further comprising an alert initiating unit adapted for initiating a haptic, visual and/or audible alert within the vehicle, which alert is adapted to be noticed by a vehicle occupant of the vehicle.

15. A vehicle comprising at least a portion of the lane shift indicating system according to claim 8, an at least partly automated steering system, and an at least partly automated vehicle speed control system.

* * * * *